July 15, 1969  A. H. EPPLER  3,455,062
ABRASIVE BLAST SYSTEM WITH CLOSED CIRCUIT RINSE
Filed Jan. 19, 1967
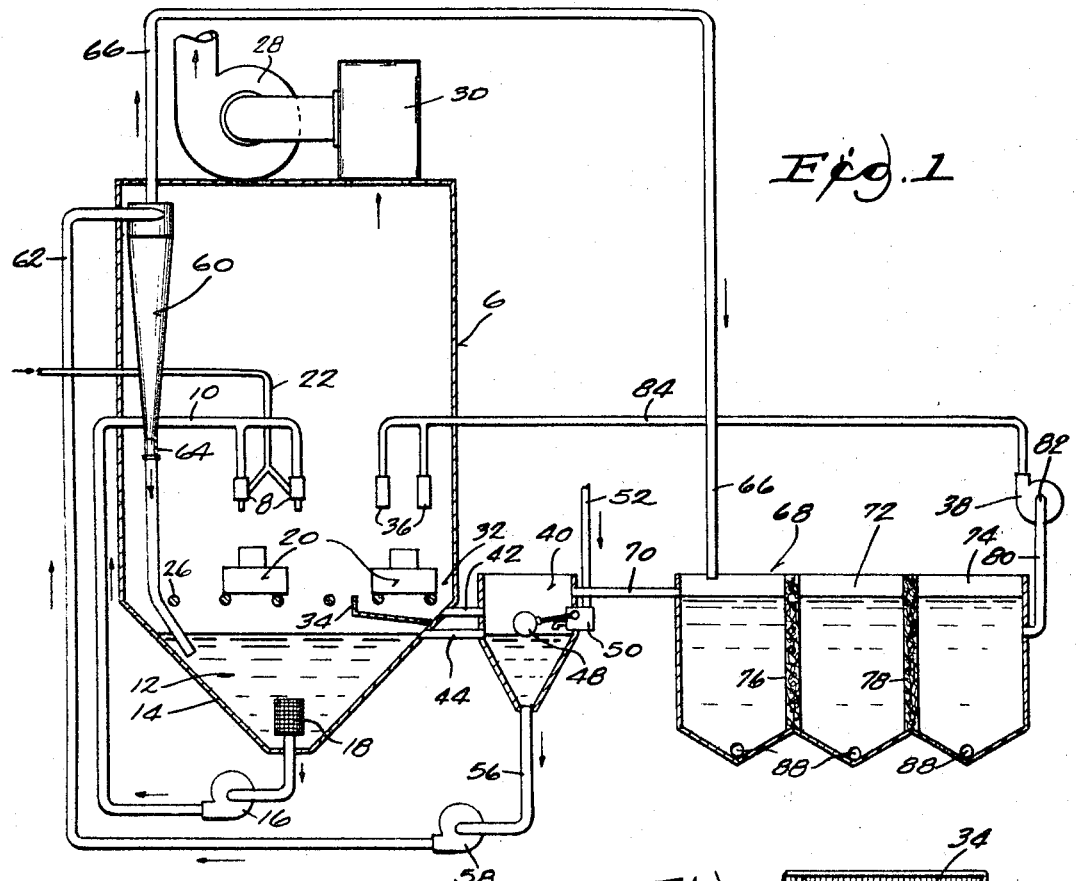
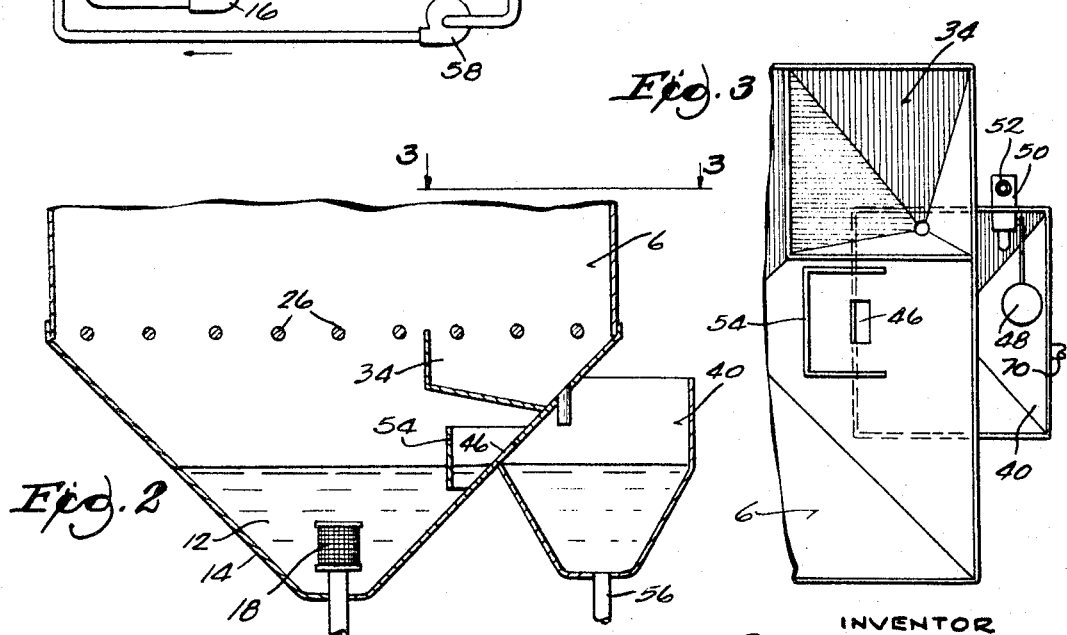
INVENTOR
ARTHUR H. EPPLER
BY Wheeler, Wheeler, House & Clemency
ATTORNEYS United States Patent Office 3,455,062
Patented July 15, 1969

3,455,062
ABRASIVE BLAST SYSTEM WITH CLOSED
CIRCUIT RINSE
Arthur H. Eppler, 2518 W. Wisconsin Ave.,
Milwaukee, Wis. 53233
Filed Jan. 19, 1967, Ser. No. 610,293
Int. Cl. B24c 3/12
U.S. Cl. 51—8        6 Claims

ABSTRACT OF THE DISCLOSURE

In addition to the usual recirculation of liquid and entrained abrasive from the sump to the blast nozzles, the rinse water is collected, centrifuged to restore the effective abrasive particles to the sump, and then subjected to settling and filtering operations to remove the fines, after which the clear rinse water is returned in a closed system for reuse. Makeup is added to the rinse water and also supplies the sump as required.

Cross reference to related application

My pending application 439,198, filed Mar. 12, 1965 and entitled Apparatus for Wet Abrasive Blasting, now Patent 3,343,304, shows details of structure illustrated only diagrammatically in the instant case.

Background of the invention

A conventional wet sand blast machine and rinsing facility uses large quantities of water and discharges therewith into the sewers large quantities of abrasive, some of which is spent and some of which is reusable. The instant device not only recycles slurry for the wet blasting operation but also recirculates the rinsing water in a closed circuit in which the reusable abrasive is segregated from the used rinse water and returned to the slurry, and then the fines which are not reusable are separately segregated from the water. The fines, if discharged into municipal sewerage systems, tend to clog these. By a combination of settling and filtering operations, these are removed from the used rinse water and the clarified rinse water is then reused for rinsing purposes. The collected fines are removed as pastes or solids and hence do not require disposal as sewage.

Summary of the invention

The invention consists in a wet sand blast machine with closed circuit rinsing means, and particularly in the specific structure whereby reusable abrasives are separated centrifugally from the rinse water and returned to the slurry prior to settling and filtering operations which remove and collect the non-reusable fines, leaving the rinse water clear for reuse as such. The invention also involves the particular relation of parts including the addition of makeup water to a tank in which used rinse water is collected, the said tank also serving as a float chamber for supplying makeup both for rinsing and for regulating liquid level in the blast chamber.

Brief description of the drawing

FIG. 1 is a diagrammatic view showing piping and pump connections to the sucessive chambers illustrated in section.

FIG. 2 is an enlarged fragmentary rear view of an actual structure which is shown only diagrammatically in FIG. 1.

FIG. 3 is a fragmentary view largely in plan on the line 3—3 of FIG. 2.

Description of preferred embodiment

The blast chamber 6 may take any desired form. The same is true of the wet blast nozzles 8, one or more of which may be supplied with slurry through pipe 10. The slurry is shown at 12 in a sump 14 at the bottom of chamber 6. A pump 16 withdraws slurry from the sump through pipe 10 to the nozzles 8. Preferably, the nozzles are of a type in which the flow of slurry toward the work 20 is accelerated by air under pressure supplied to the nozzles through pipe 22.

The work may be supported in any desired manner, as, for example, on a turntable shown in my copending application 439,198, to which cross reference has been made above. In the diagrammatic showing of FIG. 1, the work 20 is carried by rods 26. The structure thus far described exemplifies conventional practice. It is also conventional to provide an exhaust fan 28 for withdrawing vapor from blast chamber 6 through the baffle 30.

The rinse chamber 32 may be a more or less separate chamber either inside or outside of the blast chamber 6, or it may be merely a designated area of the blast chamber. It is preferred that it be partially segregated as by means of a low partition 34 to withhold rinse water from the sump. When the work 20 reaches the rinse chamber 32, it is acted on by high velocity jets of clear fluid directed against the work by nozzles 36 which are supplied with fluid by pump 38. Since recirculation is contemplated, the rinsing will normally be done by a liquid, which is usually water. Reference herein to rinse water will exemplify any appropriate fluid for rinsing purposes.

The float chamber 40 also serves to collect rinse water and entrained abrasive from the rinsing chamber 32. In practice, float chamber 40 is attached to the sump 14 of the blast chamber 6 as shown in FIGS. 2 and 3. Whether the chamber is attached or separate, means is provided as exemplified by pipe 42 for discharging rinse water and entrained abrasive into the float chamber 40. Separate means is also provided, as exemplified by pipe 44 (FIG. 1) or port 46 (FIGS. 2 and 3) for communication between the float chamber 40 and the sump 14 at water level. This level may be maintained by the float 48 in chamber 40, which regulates a valve 50 for controlling admission of makeup water supplied by pipe 52. In actual practice, the baffle at 54 (FIGS. 2 and 3) partially encloses the port 46 to tend to prevent surges of liquid to and from sump 14.

From the bottom of the float and collection chamber 40, pipe 56 leads to a pump 58 which discharges tangentially into the centrifugal separator 60 through pipe 62. The centrifugal separator 60 is commercially available. Its detailed structure is no part of the present invention but is exemplified by United States Patents Nos. 2,377,524 or 2,809,567.

Those abrasives which are still effective and therefore suitable for reuse will tend to be relatively heavy and will therefore be discharged through the lower end 64 of the separator 60 to return to the sump 14 for commingling with the slurry 12 in the sump. The now relatively clear rinse liquid and entrained fines will be discharged centrally from the upper end of the separator 60 and will pass through the discharge pipe 66 to a settling and filter chamber 68, which may be the first of a series of chambers through which the liquid passes successively. The liquid in chamber 68 will be relatively quiescent and the abrasive settles to the bottom thereof. Any excess of liquid will be returned through pipe 70 to the collecting and float chamber 40.

The settling and filter chamber 68 is preferably but one of a series of chambers, two of which are shown by way of exemplification at 72 and 74. Replaceable filters 76 and 78 permit water to pass from one chamber to the next while collecting abrasives so fine that they do not readily settle in the respective chambers.

At the end of the series, a pipe 80 connects to the inlet 82 of pump or aspirator 38 from which the high pressure discharge line 84 leads to the rinsing nozzle 36. Thus the substantially clear rinse water is reused.

The fine and non-reusable abrasives which settle out in the several chambers 68, 72, 74 may be drawn off through the drain ports 88 or may be allowed to accumulate as a pastelike sludge or as a cake which is removed from time to time mechanically.

I claim:

1. In an abrasive blast system having in combination a blast chamber for work to be blasted, a sump for slurry containing abrasive and liquid, blast nozzles, and means for projecting slurry from said sump under pressure through said nozzles against the work to be blasted, the improvement which comprises a rinse chamber, rinse liquid nozzles, means for projecting rinse liquid under pressure through said nozzles against work in the rinse chamber, and circulatory rinse liquid conduit means including the rinse chamber and the means for projecting rinse liquid against work and also including a rinse liquid collecting chamber independent of said sump and communicating with the rinse chamber, a centrifuge, a pump having inlet connection with the collecting chamber and outlet connection with the centrifuge for removing heavy solids from liquid in the collecting chamber, said centrifuge having a solids discharge to said sump and a separate discharge for liquids and fines, a settling chamber with which said separate discharge communicates and in which the fines settle out from the liquid, and means for the pressure return of the liquid substantially free of fines to said rinse nozzles.

2. An abrasive blast system according to claim 1 in which the collecting chamber communicates with the sump and is provided with a makeup supply line for liquid and a float control valve for admitting liquid from said line to the collection chamber and sump to maintain predetermined level both in the sump and in the closed circuit system.

3. An abrasive blast system according to claim 1 in which the settling chamber is followed by a series of chambers through which the rinse liquid passes successively.

4. An abrasive blast system according to claim 3 in which filter partitions intervene between successive settling chambers.

5. An abrasive blast system according to claim 1 in which said rinse liquid collecting chamber has overflow means which communicates with said sump, and in further combination has a makeup liquid supply line leading to said collecting chamber, a valve controlling liquid delivery from said supply line into the collecting chamber, and a float in the collecting chamber having connection with said valve for the operation thereof for delivering makeup liquid into the collecting chamber for replacement of losses occurring both in the sump and in said collecting chamber.

6. An abrasive blast system according to claim 5 in which the liquid collection chamber is attached to the sump and the sump has an opening in its side wall providing the aforesaid communication of the collecting chamber with the sump, the sump having a baffle about said opening.

References Cited

UNITED STATES PATENTS

| 3,122,863 | 3/1964 | Millhiser et al. | 51—8 |
| 3,153,882 | 10/1964 | Millhiser | 51—15 |
| 3,192,677 | 7/1965 | Johnson et al. | 51—14 X |
| 3,300,903 | 1/1967 | Kosar | 51—13 |
| 3,343,304 | 9/1967 | Eppler | 51—8 |
| 3,352,063 | 11/1967 | Eppler | 51—15 X |

FOREIGN PATENTS

| 892,699 | 3/1962 | Great Britain. |

LESTER M. SWINGLE, Primary Examiner